(12) United States Patent
Nonoshita

(10) Patent No.: US 7,850,564 B2
(45) Date of Patent: *Dec. 14, 2010

(54) BICYCLE SPROCKET

(75) Inventor: Tetsu Nonoshita, Izumi (JP)

(73) Assignee: Shimano Inc., Osaka (JP)

( * ) Notice: Subject to any disclaimer, the term of this patent is extended or adjusted under 35 U.S.C. 154(b) by 910 days.

This patent is subject to a terminal disclaimer.

(21) Appl. No.: 11/078,351

(22) Filed: Mar. 14, 2005

(65) Prior Publication Data

US 2005/0282672 A1 Dec. 22, 2005

(30) Foreign Application Priority Data

Jun. 22, 2004 (JP) .............................. 2004-183447

(51) Int. Cl.
*F16H 55/06* (2006.01)

(52) U.S. Cl. ....................................... 474/161; 474/152

(58) Field of Classification Search ................ 474/152, 474/174, 164, 161, 162; 74/443, 441, 574.4
See application file for complete search history.

(56) References Cited

U.S. PATENT DOCUMENTS

| | | | | |
|---|---|---|---|---|
| 3,200,665 | A * | 8/1965 | Wells ........................... | 74/446 |
| 3,257,860 | A * | 6/1966 | Runde et al. .................. | 474/94 |
| 3,469,465 | A | 9/1969 | Bebbington, Jr. et al. | |
| 3,550,465 | A | 12/1970 | Maeda | |
| 3,696,685 | A * | 10/1972 | Lampredi .................... | 474/161 |
| 3,909,387 | A * | 9/1975 | Kolic et al. .................. | 204/206 |
| 4,144,773 | A * | 3/1979 | Addicks ...................... | 474/161 |
| 4,318,310 | A | 3/1982 | Segawa | |
| 4,475,894 | A | 10/1984 | Sugino | |
| 4,589,860 | A | 5/1986 | Brandenstein et al. | |
| 4,867,733 | A * | 9/1989 | Yamanoi et al. ............ | 474/161 |
| 4,869,709 | A | 9/1989 | Nagano | |
| 4,946,427 | A * | 8/1990 | Rampe ........................ | 474/161 |
| 5,026,329 | A * | 6/1991 | Diekevers ................... | 474/162 |
| 5,203,861 | A * | 4/1993 | Irwin et al. .................. | 474/161 |
| 5,360,378 | A | 11/1994 | Suzuki et al. | |
| 5,368,525 | A * | 11/1994 | Funahashi ................... | 474/190 |
| 5,852,951 | A | 12/1998 | Santi | |

(Continued)

FOREIGN PATENT DOCUMENTS

CN 2583450 10/2003

(Continued)

*Primary Examiner*—Bradley T King
*Assistant Examiner*—Thomas Irvin
(74) *Attorney, Agent, or Firm*—Global IP Counselors, LLP

(57) ABSTRACT

A bicycle sprocket is provided that has a synthetic resin fastening part, to facilitate weight saving and prevent the reduction of fastening power (strength) due to deterioration or deformation of the synthetic resin. The sprocket includes a sprocket ring part and a synthetic resin fastening part. The sprocket ring part includes an inner periphery and an outer periphery with a plurality of sprocket teeth arranged on the outer periphery. The sprocket ring part extends around a central rotation axis. The fastening part is non-movably coupled to the sprocket ring part at a location radially inwardly of the sprocket teeth relative to the rotation axis. The fastening part includes at least one through hole with a metallic tubular member mounted therein and configured to be fixedly coupled to a rotational drive unit of a bicycle. The tubular member has a first fastener contact surface configured to receive a fastening force.

19 Claims, 10 Drawing Sheets

U.S. PATENT DOCUMENTS

| | | | | |
|---|---|---|---|---|
| 5,947,852 | A * | 9/1999 | Moretz | 474/161 |
| 6,064,027 | A * | 5/2000 | Santi | 219/69.12 |
| 6,336,882 | B1 * | 1/2002 | Ullein et al. | 474/161 |
| 6,585,615 | B2 * | 7/2003 | Uota | 474/242 |
| 6,656,072 | B2 * | 12/2003 | Sugita et al. | 474/161 |
| 6,875,113 | B2 * | 4/2005 | Nichols | 464/90 |
| 2002/0109864 | A1 * | 8/2002 | Nishikino et al. | 358/418 |
| 2004/0092352 | A1 | 5/2004 | Chiang | |
| 2005/0032596 | A1 * | 2/2005 | Nonoshita et al. | 474/175 |
| 2006/0205549 | A1 * | 9/2006 | Nonoshita et al. | 474/160 |

FOREIGN PATENT DOCUMENTS

| | | |
|---|---|---|
| DE | 20218755 U1 | 2/2003 |
| EP | 0002964 A1 | 7/1979 |
| EP | 0 764 575 A2 | 3/1997 |
| EP | 1 504 988 A | 2/2005 |
| FR | 983303 | 6/1951 |
| FR | 2 615 473 A1 | 11/1988 |
| JP | 56-147960 A | 11/1981 |
| JP | 63-180768 A | 7/1988 |
| JP | 63-126658 U | 8/1988 |
| JP | 63-126659 U | 8/1988 |
| JP | 63-126660 U | 8/1988 |
| JP | 63-126661 U | 8/1988 |
| JP | 63-137164 U | 9/1988 |
| TW | 319750 | 11/1997 |
| TW | 416406 | 12/2000 |
| TW | 537284 | 6/2003 |
| TW | 547346 | 8/2003 |

* cited by examiner

BICYCLE SPROCKET

CROSS-REFERENCE TO RELATED APPLICATIONS

This application claims priority to Japanese Patent Application No. 2004-183447. The entire disclosure of Japanese Patent Application No. 2004-183447 is hereby incorporated herein by reference.

BACKGROUND OF THE INVENTION

1. Field of the Invention

The present invention generally relates to a bicycle sprocket. More specifically, the present invention relates to a bicycle sprocket configured to be mounted to a rotational drive unit such as a crank of a bicycle via a synthetic resin fastening part and to have a bicycle (drive-purpose) chain wrapped around the outside circumference of a sprocket ring part thereof.

2. Background Information

A bicycle is generally provided with a drive unit or drive train having front and rear sprockets and a chain wrapped around the sprockets. The front sprocket(s) is provided on the gear crank of the bicycle and the rear sprocket(s) is provided on the free hub of the bicycle. This type of bicycle sprocket is made of such materials as the aluminum having the designation A2014P under the standard JIS H4000 (category) or the iron having the designation SPCC under the standard JIS G3141 (category). When a plurality of sprockets are mounted to the gear crank and free hub in order to provide multiple gears, aluminum is used as the material in order to reduce the weight.

There are also known bicycle sprocket designs that reduce the weight even further by having a sprocket ring part that is made of aluminum and has the sprocket teeth formed thereon and a fastening part that is made of a carbon fiber material, attached to the inner circumference of the sprocket ring part, and fastened to the gear crank (see German Utility Model Publication No. 20218755). In the case of this sprocket, the fastening part and an inner circumferential portion of the sprocket ring part are fastened together by installing crimp pins in semicircular holes provided in the sprocket ring part and the fastening part. Since the sprocket is made using two separate members, a gap is provided between the sprocket ring part and the fastening part in order to prevent deformation caused by the effects of weather. In addition, mounting holes with steps are formed in the fastening part of the gear crank. In the sprocket constructed in this manner, generally, a bolt (an example of fixed member) is passed through the mounting hole, and the sprocket is fixed to a spider arm of the gear crank via the bolt and the fastening part.

In the conventional bicycle sprocket just described, age deterioration of synthetic resin fastening part can occur at certain areas resulting in a potential loss of attachment forces. In addition, if the fastening bolts are tightened with too much torque, the synthetic resin fastening part can become deformed, and as the result, there is a possibility for reduced attachment forces. Any reduction in attachment forces can result in play or looseness, adversely affecting operation of the sprocket, shifting of the chain and/or potentially decreasing efficiency of power transfer from the rider to the chain.

In view of the above, it will be apparent to those skilled in the art from this disclosure that there exists a need for an improved bicycle sprocket. This invention addresses this need in the art as well as other needs, which will become apparent to those skilled in the art from this disclosure.

SUMMARY OF THE INVENTION

One object of the present invention is to provide a bicycle sprocket that is constructed of two different materials, which is light weight, maintains rigidity, prevents looseness or play, and can be fabricated with a simplified manufacturing process.

Another object of the present invention is to provide a bicycle sprocket that prevents a reduction in attachment forces or the attachment strength because of age deterioration of the synthetic resin fastening part, and/or because of deformation of the synthetic resin fastening part.

The foregoing objects can basically be attained by providing a bicycle sprocket according to a first aspect of the present invention. The bicycle sprocket according to the first aspect of the present invention includes a sprocket ring part and a synthetic resin fastening part. The sprocket ring part includes an inner periphery and an outer periphery with a plurality of sprocket teeth arranged on the outer periphery. The sprocket ring part extends around a central rotation axis. The synthetic resin fastening part is non-movably coupled to the sprocket ring part at a location radially inwardly of the sprocket teeth relative to the rotation axis. The synthetic resin fastening part includes at least one through hole with a metallic tubular member mounted therein and configured to be fixedly coupled to a rotational drive unit of a bicycle. The metallic tubular member has a first fastener contact surface configured and arranged to receive a fastening force.

With this sprocket, using the synthetic resin fastening part to connect the sprocket ring part to the turning drive part (a rotational drive unit of a bicycle or crank) results in a sprocket that is relatively light weight. This synthetic resin fastening part has a mounting hole, and the metallic tubular (tubelike) member is mounted in the mounting hole. A fixed member, such as a bolt, is passed through this tubular member to fix the sprocket to the rotational drive unit of the bicycle (turning drive member). With this arrangement, the fastening part and also the first contact surface of the tubular member receive axial fastening forces. Since a metallic tubular member that does not deteriorate with age as much as synthetic resin is mounted in the fastening part, and the first contact surface of the tubular member receives an axial force from the bolt to attach the fixing portion of the fastening part to the rotational drive unit, sufficient attachment forces are maintained, and the fixing portion of the fastening part that is attached to the turning drive member is difficult to be deformed even though relatively soft synthetic resin (i.e. softer than typical metallic materials) is used for the fastening part to achieve weight savings. Because of this arrangement, the reduction of axial fastening forces due to age deterioration of synthetic resin or deformation can be minimized and/or prevented, and thus, weight savings for the sprocket can be facilitated without compromising performance.

In a bicycle sprocket in accordance with a second aspect of the present invention, the metallic tubular member is non-movable relative to the synthetic resin fastening part in an axial direction substantially parallel to the central rotation axis. In other words, the tubular member is mounted in the mounting hole to become unmovable along the direction of the axis. In this case, since the metallic tubular member is mounted to become unmovable along the direction of the axis, the attachment force from a fixed member such as a bolt can be reliably (certainly) received by the first contact surface.

In a bicycle sprocket in accordance with a third aspect of the present invention, the synthetic resin fastening part is at least partially integrally molded around the metallic tubular member to prevent movement of the metallic tubular member relative to the synthetic resin fastening part (e.g. especially in the axial direction). In other words, the tubular member is formed with the fastening part. In this case, since the tubular member has the synthetic resin fastening part at least partially molded/formed around it, such as by insert forming, it can be easily mounted to become unmovable along the direction of the axis.

In a bicycle sprocket in accordance with a fourth aspect of the present invention, the metallic tubular member includes a flange section extending outwardly therefrom relative to a central through axis of the metallic tubular member, the first contact surface being formed on the flange section. In other words, the tubular member has a tubular part and a guard part larger than the tubular part, and the first contact surface is set up on the guard part. In this case, since, by including the guard part, the tubular member can be mounted in the fastening part to become unmovable along the direction of the axis, and the first contact surface can be arranged to contact the fixed member such as a bolt at the relatively larger guard part, the area of the first contact surface gets larger, and the pressure on the first contact surface gets less (per unit area) even if it receives power from the fixed member such as a bolt. In addition, when the fastening part and tubular member are formed together, both parts can be powerfully held (strongly formed) by putting the guard part into the inner member.

In a bicycle sprocket in accordance with a fifth aspect of the present invention, the metallic tubular member includes a second contact surface that is configured and arranged to contact the rotational drive unit. In other words, the tubular member has the second contact surface that contacts the turning drive member. In this case, since the second contact surface of the metallic tubular member contacts the turning drive member, the axial fastening force (power) is transferred through the tubular member when the sprocket is fixed with the fixed member such as a bolt. Because of this, the fixed portion of the fastening part that is fixed with the turning drive member is hardly deformed.

In a bicycle sprocket in accordance with a sixth aspect of the present invention, the sprocket ring part includes a pair of sides and the synthetic resin fastening part is at least partially integrally molded around both sides of the sprocket ring part. In other words, the sprocket ring part is metallic, and the fastening part is formed with (i.e. partially around) both sides of the sprocket ring part. In this case, the fastening part is placed on the both sides of the sprocket ring part so that the rigidity between the sprocket ring part and the fastening part can be maintained. In addition, since the crimp pins previously used in the prior art to couple these parts together are unnecessary with the present invention, the manufacturing process can be simplified.

In a bicycle sprocket in accordance with a seventh aspect of the present invention, the bicycle sprocket further comprises a fastening member with an enlarged head that is sized and configured to contact the first fastener contact surface to apply the fastening force. The fastening member is preferably a bolt with a threaded shaft and the enlarged head arranged at one end of the threaded shaft. In other words, the fixed member is a bolt that has a head, and the tubular member contacts the head of the bolt. In this case, even if the head of the bolt contacts the first contact surface of the tubular member, the first contact surface is hardly deformed.

In a bicycle sprocket in accordance with an eighth aspect of the present invention, the sprocket ring part includes a first anchor structure and the synthetic resin fastening part includes a second anchor structure that cooperates with the first anchor structure to prevent relative movement therebetween. In other words, the sprocket ring part additionally has an anchoring means to unrotatably connect the fastening part thereto. In this case, the sprocket ring part and the fastening part are unrotatably connected by the anchor means so that rigidity/strength is increased.

In a bicycle sprocket in accordance with a ninth aspect of the present invention, the synthetic resin fastening part is constructed of a polyamide based-based synthetic resin with a carbon fiber filler impregnated therein. In other words, the fastening part is made of carbon fiber resin incorporation that impregnates a carbon fiber filler with polyamide based synthetic resin. In this case, the strength of the fastening part can be stronger by impregnating carbon fiber than with synthetic resin alone (not including the carbon fiber impregnation).

In a bicycle sprocket in accordance with a tenth aspect of the present invention, the sprocket ring part is constructed of an aluminum alloy that has an anodic oxide layer formed on the surface thereof. In other words, the sprocket ring part is made of aluminum base alloy that has anodized, oxidized porous aluminum, and/or an alumilite layer formed on its surface. In this case, the corrosion resistance of the sprocket ring part is improved.

In a bicycle sprocket in accordance with an eleventh aspect of the present invention, the metallic tubular member is constructed of an aluminum alloy. In other words, the tubular member is made of an aluminum base alloy. In this case, even if the tubular member is mounted to prevent deforming of the fastening part, weight savings can be facilitated.

According to this invention, the metallic tubular member, which is more difficult to be deteriorated with age than synthetic resin, is mounted in the fastening part, and the first contact surface of the tubular member receives power (axial force) from the fixed member such as a bolt. Thus, even if relatively soft synthetic resin (i.e. softer than commonly used metallic materials) is used in the fastening part to facilitate weight saving, adequate fixing forces (power) is maintained, the fixed portion of the fastening part that is fixed to the turning drive member is hardly deformed, and lowering of the fixing forces (power) due to deterioration of synthetic resin and/or deforming can be minimized and/or prevented. Accordingly, weight saving of the sprocket can be facilitated with adversely affecting other characteristics and/or performance of the sprocket.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
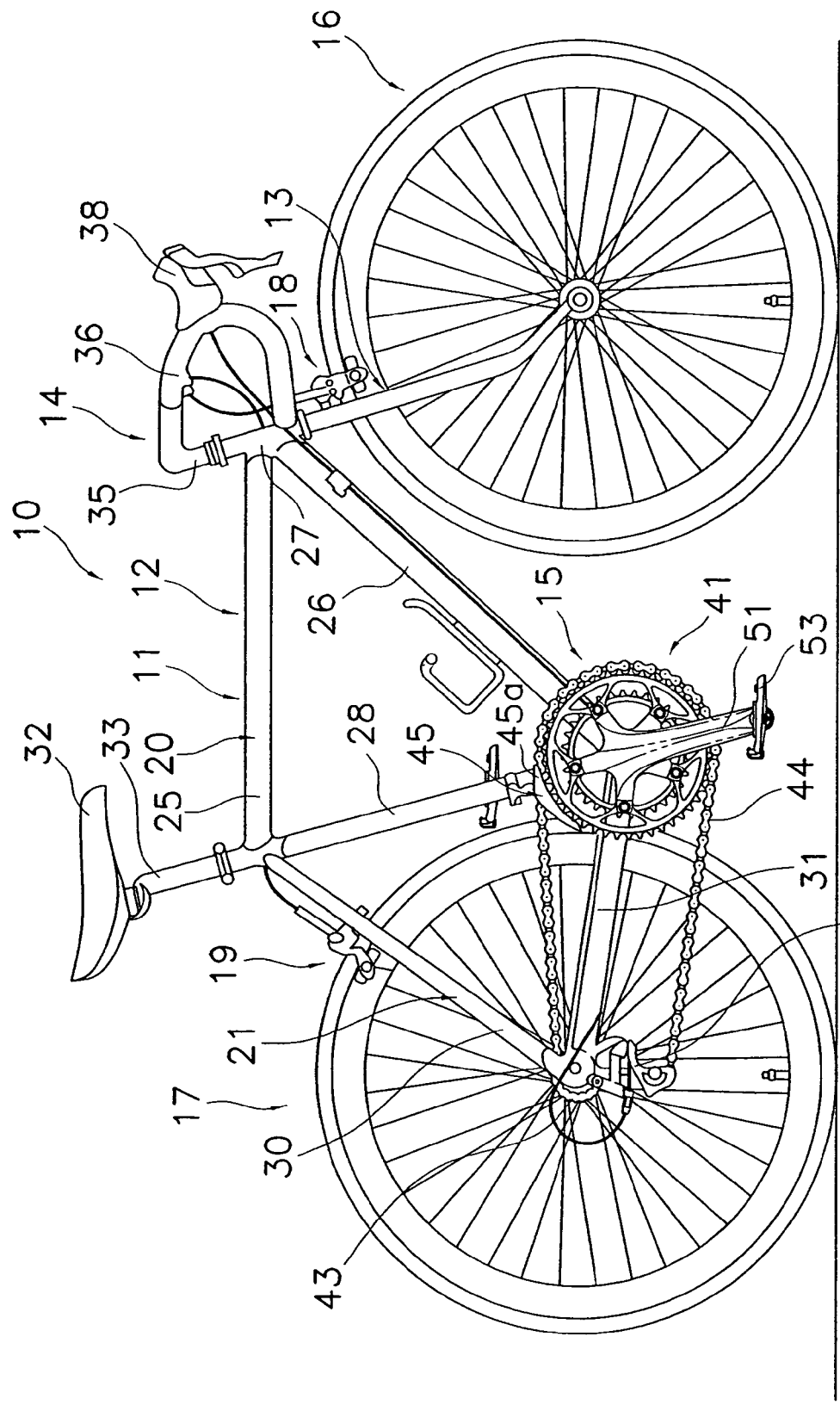
FIG. 1 is a side elevational view of bicycle having a front crank set with a sprocket in accordance with a preferred embodiment of the present invention mounted thereto.

Referring initially to FIG. 1, a bicycle 10 is illustrated in accordance with a first embodiment of the present invention. As an example of a bicycle 10 that employs an embodiment of the present invention, FIG. 1 shows a road bike 10 having a drop-type handlebar unit 14. The road bike 10 has a diamond-shaped frame 11 that serves as the framework of the bicycle body. The frame 11 has a frame body 12 and a front fork 13. The front fork 13 is supported on a front part of the frame 12 such that it can rotate freely about an axis that is tilted slightly from vertical. The lower part of the front fork 13 is divided into two prongs. The bicycle 10 is also provided with the handlebar unit 14 connected to the front fork 13, and in addition a drive unit or drive train 15, a front wheel 16, a rear wheel 17 and front and rear brake devices 18 and 19. The drive train 15 is configured to convert the rider's pedaling force into driving force. The front wheel 16 is supported in a freely rotatable manner on the bottom end of the front fork 13 between the prongs. The rear wheel 17 is supported in a freely rotatable manner on a rear part of the frame body 12.

The frame body 12 has a triangular shaped main or front triangle 20 and a rear triangle 21 arranged rearward of the front triangle 20. The front triangle 20 is formed by a top tube 25, a down tube 26, head tube 27 and a seat tube 28. The top tube 25 is arranged generally horizontally, while the down tube 26 is arranged below the top tube 25 such that it slants upward toward the front. The head tube 27 is joined to the front ends of the top tube 25 and the down tube 26, while the seat tube 28 extends diagonally upward and is joined to the rear ends of the top tube 25 and down tube 26. A seat post 33 having a saddle 32 fastened thereto is secured in the seat tube 28 in such a manner that its position can be adjusted up and down. A cylindrical hanger 29 (FIG. 3) is formed at the portion where the seat tube 28 and the down tube 26 join. The rear triangle 21 is formed by a pair of seat stays 30, a pair of chain stays 31 and the seat tube 28. The seat stays 30 are joined at their front ends to the seat tube 28 and extend diagonally downward as two separate prongs. The chain stays 31 extend rearward as two separate prongs from the bottom end of the seat tube 28 (i.e. the cylindrical hanger 29) and are joined at their rear ends to the seat stays 30.

The handlebar unit 14 includes a handlebar stem 35 that is fastened to the upper part of the front fork 13 in such a manner that its vertical position can be selectively adjusted up and down relative to the front fork 13. A handlebar 36 extends to the left and right and is curved at both ends. The handlebar 36 is fastened to the top end of the handlebar stem 35. A pair of braking devices 38 that are provided with gear shifting capability are mounted to opposite ends of the handlebar 36.

The drive unit or drive train 15 includes a front crank set or crank unit 41, a rear sprocket assembly or small gear unit 43, a chain 44, a front derailleur 45 and a rear derailleur 46. The crank set (crank unit) 41 is mounted on the hanger 29. The rear sprocket assembly (small gear unit) 43 mounted in a non-rotatable manner to the free hub or free wheel of the rear wheel 17. The chain 44 is arranged on the crank set (gear crank unit) 41 and the rear sprocket assembly (small gear unit) 43 so as to extend therebetween. The front derailleur 45 is coupled to the seat tube 28, while the rear derailleur 46 is coupled to the rear triangle 21. The derailleurs 45 and 46 function as a means of changing gears. The front derailleur 45 has a chain guide 45a through which the chain 44 passes.

Figure 2:
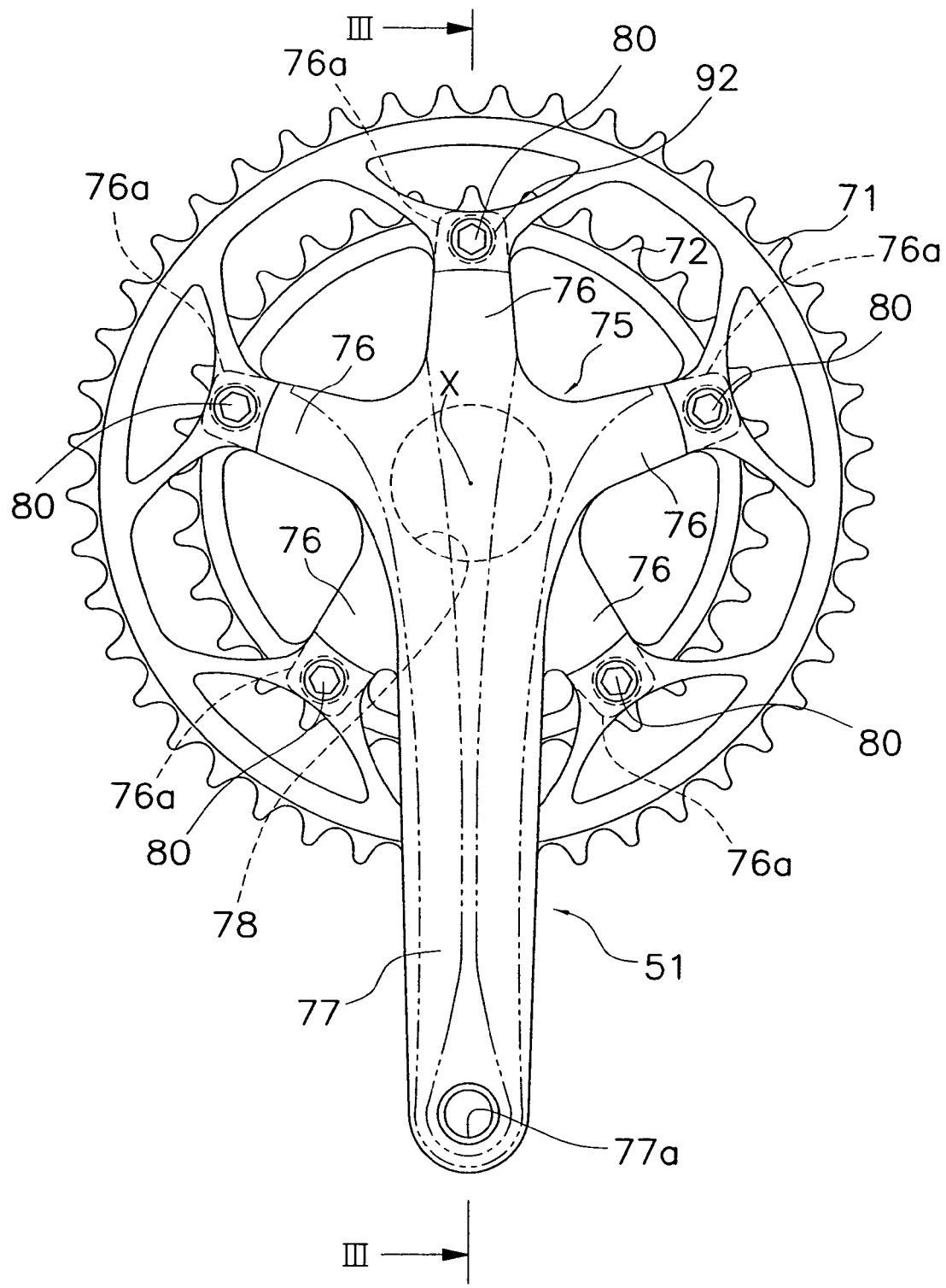
FIG. 2 is an enlarged side elevational view of the front crank set of the bicycle illustrated in FIG. 1.
Figure 3:
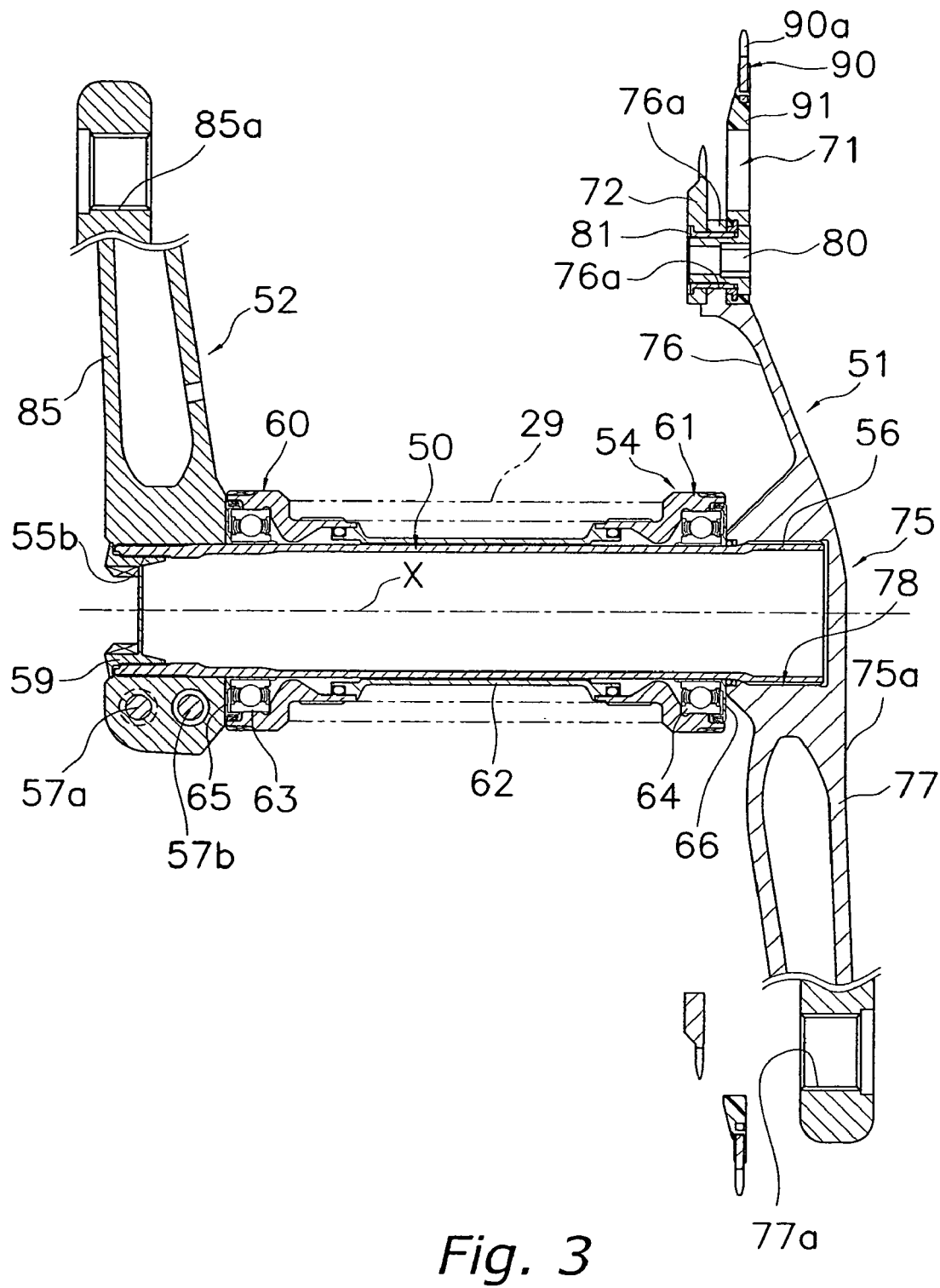
FIG. 3 is a partial, transverse, cross sectional view of the front crank set illustrated in FIGS. 1 and 2, as seen along section line III-III of FIG. 2.

As shown in FIGS. 1-3, the crank set (crank unit) 41 basically includes a crank shaft 50 (FIG. 3), a right crank arm (gear crank) 51 and a left crank arm (left crank) 52. The crank shaft 50 is supported in a freely rotatable manner in the hanger 29 of the frame 11. The right crank arm 51 is crimp-fastened to the right end of the crank shaft 50 and has a pedal 53 (FIG. 1) mounted to its tip end, while the left crank arm 52 (FIG. 3) is fastened in a detachable manner to the left end of the crank shaft 50 with another pedal (that is a mirror image of the pedal 53) mounted to its tip end such that the rider can provide a pedaling force to the drive train 15, as best seen in FIG. 1.

As shown in FIG. 3, the crank shaft 50 is mounted in a freely rotatable manner in the hanger 29 by means of a bottom bracket 54 mounted in the hanger 29 for rotation about a central rotation axis X. Thus, the crankset 41 is freely rotatable about the central rotation axis X. The crank shaft 50 is a hollow pipe-shaped member made of a high-rigidity alloy, such as chromium-molybdenum steel. The radially inwardly facing surface of the left end of crank shaft 50 is provided with internal threads 55b so that the left crank arm 52 can be fastened thereto with a bolt 59.

The bottom bracket 54 includes a left and right bearing housings 60 and 61, a cylindrical linking member 62, left and right ball bearings 63 and 64, and left and right cover members 65 and 66. The left and right bearing housings 60 and 61 are screwed into the ends of the hanger 29. The cylindrical linking member 62 is concentric with and connects mates to the left and right bearing housings 60 and 61 via a pair of additional bearings. The left and right ball bearings 63 and 64 are mounted in the left and right housings 60 and 61, respectively. The left and right cover members 65 and 66 are mounted between the crank shaft 50 and the inner rings (races) of the left and right ball bearings 63 and 64, respectively.

The ball bearings 63 and 64 are sealed bearings having seals installed between the inner ring (race) and the outer ring (race) and are injected with grease in advance of assembling the bottom bracket 54. Consequently, lubrication maintenance can be eliminated. Arranging the bearings 63 and 64 outside the hanger 29 enables the diameter of the crank shaft 50 to be increased and, as a result, the crank shaft 50 can be made lighter in weight while maintaining high strength and rigidity by making the crank shaft 50 hollow.

As shown in FIGS. 2 and 3, the right crank arm (gear crank) 51 includes a crank connecting part or portion 75, five support arm parts or portions 76 and a main right crank arm part or portion 77. The crank connecting portion 75 has an engagement depression 78 that forms a circular space and mounts in a non-rotatable manner to the right end of the crank shaft 50. The five support arm portions 76 extend radially outwardly from the crank connecting portion 75 and are configured such that two sprockets 71 and 72 (one large and one small, respectively) can be mounted on the tip ends thereof. The main crank arm portion 77 is preferably integrally formed with the crank connecting portion 75 and the five support arm portions 76 such that the right main crank arm portion 77 fixed to the right end of the crank shaft 50.

Figure 5:
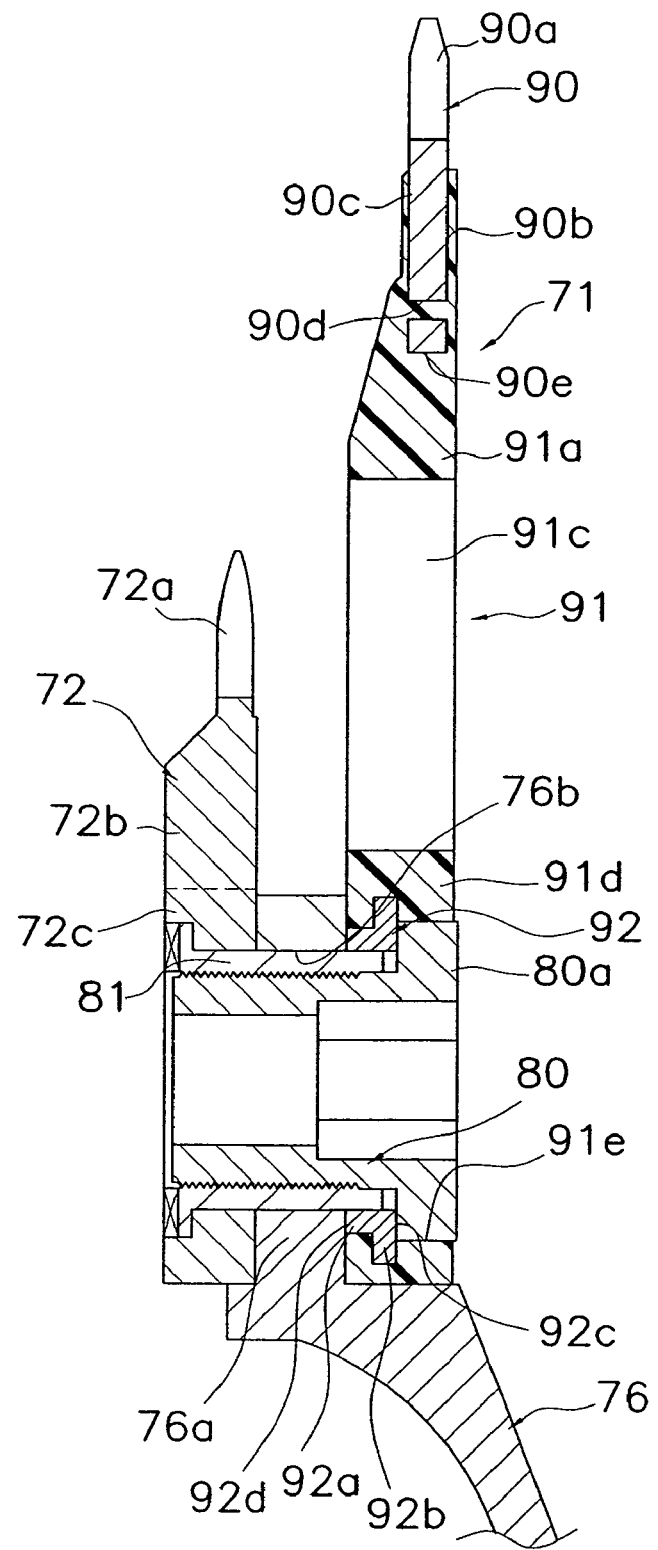
FIG. 5 is an enlarged, partial cross sectional view of the sprocket illustrated in FIG. 4, as seen along section line V-V of FIG. 4, with the right crank arm of the crank set coupled thereto for the purpose of illustration.

The tip ends of the support arm portions 76 are provided with mounting sections (parts) 76*a* for attaching the sprockets 71 and 72 thereto. The mounting sections 76*a* are recessed on opposite axial sides thereof relative to the other portions to form radially outwardly facing abutment surfaces. Thus, the sprockets 71 and 72 are mounted on both (opposite) sides of the mounting sections 76*a* in such a manner that the sprockets 71 and 72 are concentric with respect to the crank shaft 50 and the central rotation axis X. As shown in FIG. 5, each of the mounting sections 76*a* is provided with a first fastening hole 76*b* that extends in an axial direction. Thus, the sprockets 71 and 72 can be fastened simultaneously to the mounting sections 76*a* with (five) bolts 80 and nuts 81. As shown in FIG. 3, the right main crank portion 77 has a hollow structure and is formed integrally with the crank connecting portion 75 and the support arm portions 76. The right crank portion 77 extends radially outwardly, while slanting slightly outward in the axial direction from the outside surface 75*a* of the crank connecting portion 75. A threaded pedal mounting hole 77*a* is provided in the extended tip end of the right main crank portion 77 for installing the pedal 53.

As shown in FIG. 3, the engagement depression 78 of the crank connecting portion 75 is mounted to the second portion 56 of the crank shaft 50. The engagement depression 78 is formed to a length (i.e., depth) that is larger than the length of the second portion 56 and reaches almost to the outside surface 75*a*. As a result, the outside surface 75*a* of the crank connecting portion 75 and the main right crank portion 77 is smoothly curved and free of irregularities. Also, the depth of the engagement depression 78 is shorter than the diameter of the second portion 56 of the crank shaft 50.

Figure 4:
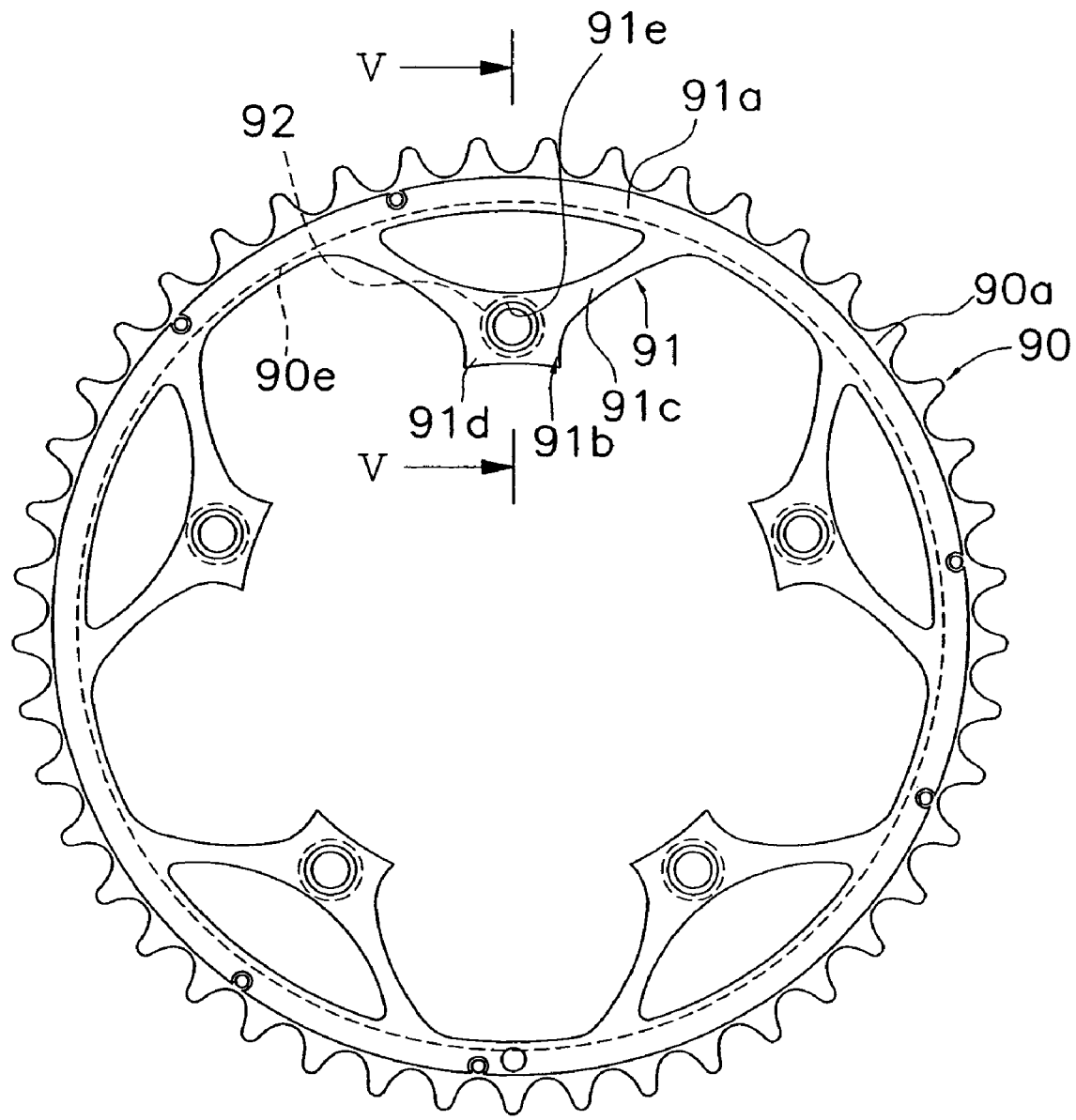
FIG. 4 is side elevational view of the large sprocket of the front crank set illustrated in FIGS. 1-3, with the other parts of the crank set removed for the purpose of illustration.
Figure 6:
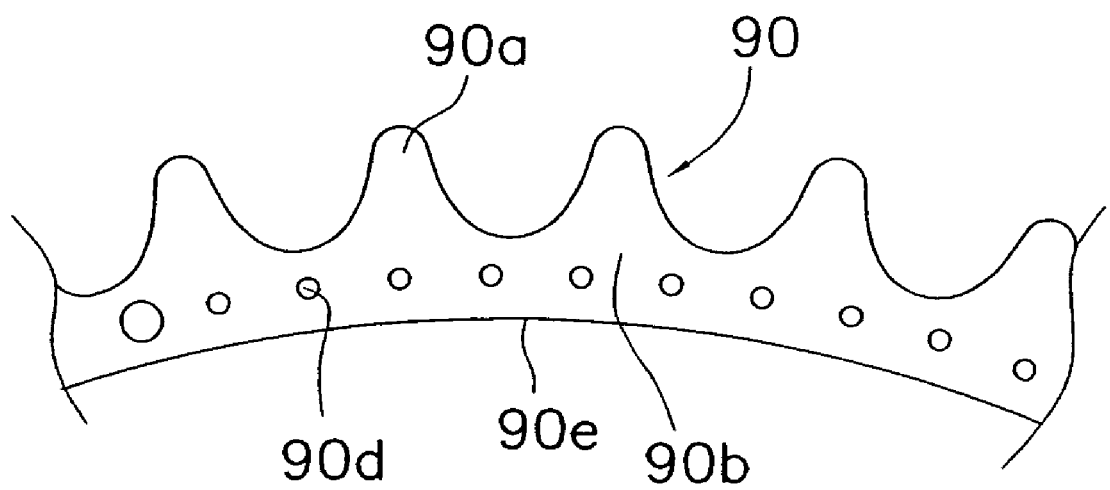
FIG. 6 is an enlarged partial side elevational view of the sprocket ring part of the sprocket illustrated in FIG. 4, in order to illustrate the arrangement of through holes of the sprocket ring part.

As shown in FIGS. 4-6, the sprocket 71 in accordance with a preferred embodiment of the present invention basically includes a sprocket ring part 90, a fastening part 91 and a plurality (five) of tubular members 92. The sprocket ring part 90 and the tubular members 92 are constructed of metal (e.g. aluminum alloy), while the fastening part 91 is constructed of synthetic resin, formed integrally with (partially around) the sprocket ring part 90 and the tubular members 92. The construction of the sprocket 71 in accordance with the present invention will be explained in more detail below. The fastening part 91 is fastened to the right crank arm 51 (FIGS. 2 and 3) using the tubular members 92 as also explained in more detail below.

The sprocket ring part 90 is a ring-shaped member having multiple (i.e. a plurality of) sprocket teeth 90*a* formed on the outside circumference thereof upon which the chain 44 (FIG. 1) is wrapped. As shown in FIG. 6, multiple (i.e. a plurality of) circumferentially spaced through holes 90*d* are provided that extend between (first and second) lateral sides or side surfaces 90*b* and 90*c* of the sprocket ring part 90. Preferably, through holes 90*d* are arranged around the entire circumference of the sprocket ring part 90. The through holes 90*d* form a first anchor structure (means) for rigidly connecting the fastening part 91 in a non-rotatable manner. The synthetic material of the fastening part 91 extends through the holes 90*d* to form a second anchor structure that cooperates with the first anchor structure to prevent relative movement therebetween. In this embodiment, the sprocket ring part 90 is preferably constructed by die punching a metal plate into the ring shape having sprocket teeth 90*a* formed on the outside circumference thereof and the through holes 90*d* extending between both lateral faces 90*b* and 90*c* thereof.

The fastening part 91 is preferably constructed of a polyamide-based synthetic resin impregnated with a reinforcing material such as a carbon fiber filler. The fastening part 91 is formed integrally around both lateral sides or side surfaces 90*b* and 90*c* of the sprocket ring part 90 at an area of the sprocket ring part 90 located radially inward of where the sprocket teeth 90*a* are formed. The fastening part 91 has a ring section (part) 91*a* and a screw fastening section (part) 91*b*. The ring section 91*a* is molded integrally (partially) around and through the sprocket ring part 90 (i.e. through the through holes 90*d*). The screw fastening section 91*b* extends radially inward from the ring section 91*a*. The screw fastening section 91*b* has a plurality of second fastening holes positioned such that they can be aligned with the first fastening holes 76*b*. The ring section 91*a* is formed integrally such that it substantially covers both lateral faces 90*b* and 90*c* as well as the radially inwardly facing surface 90*e* of the sprocket ring part 90. The screw fastening section (part) 91*b* is preferably molded integrally (partially) around the tubular members 92, as explained below. The screw fastening section 91*b* has a plurality (five) of arch elements (parts) 91*c* that extend radially inwardly from the radially inward facing surface of the ring section 91*a* to form a plurality (five) arm fastening flanges (parts) 91*d* formed on a middle portion of each arch element 91*c*. The arm fastening flanges 91*d* are positioned to be aligned face to face with the mounting sections 76*a* on the tip ends of the support arm portions 76. Each fastening flange 91*d* includes and axially extending (stepped) mounting hole 91*e* that is arranged to be aligned with one of the first fastening holes 76*b*. The stepped shape of the mounting holes is due to the fastening part 91 being at least partially molded around the tubular members 92. Thus, the tubular members 92 are mounted to be unmovable relative to the fastening part. In any case, the tubular members 92 are mounted to be unmovable along the axial direction (i.e. substantially parallel to the central rotation axis X) in the mounting holes 91*e*.

The tubular members 92 are preferably constructed of an aluminum (base) alloy. Each tubular member 92 includes a tubular part 92*a* and a flange section (guard part) 92*b* extending outwardly from the tubular part 92*a* relative to a central through axis of the metallic tubular member 92. The flange section 92*b* is larger than the tubular part 92*a*. The tubular members 92 are preferably identical and preferably attached to the fastening part 91 in and identical manner. Thus, only one of the tubular members 92 will be explained and/or illustrated in detail herein. The flange section (guard part) 92*b* has a first annular axially facing fastener contact surface 92*c* formed on the outer axial end to receive power (an axial fastening force) from one of the bolts 80 by contacting a head part 80*a* of one of the bolts 80. The outer circumferential part of the flange section 92*b* is fitted in an inner (annular) circumferential groove of one of the stepped mounting holes 91*e*. In fact, the outer circumferential parts of the flange sections 92*b* form inner circumferential grooves of the stepped mounting holes 91*e* when the fastening part 91 is molded around the outer circumferential parts of the flange sections 92b. Because of this, the tubular members 92 are retained with the fastening part 91 (i.e. the tubular members 92 will not fall out of the holes 91e and can be certainly fixed to be unmovable along the direction of the axis X). In addition, each of the tubular parts 92a has a second annular axially facing contact surface 92d that contacts one of the mounting sections (parts) 76a of the right crank arm (gear crank) 51 on the outwardly axially facing surface thereof. Since the first contact surface 92c of the metallic tubular member 92 contacts with the head 80a of the bolt 80 rather than the fastening part 91 in this manner, the tubular member 92 and the fastening part 91 are hardly deformed even if a large power affect from a chain is applied, or if the bolt 80 is tightened with too much torque. In addition, the second contact surface 92d of the metallic tubular member 92 contacts with the mounting section (part) 76a so that the power affects and/or axial tightening forces are applied (i.e. transferred through) the metallic tubular member 92 instead of the synthetic resin fastening part 91 when the sprocket 71 is fixed by the bolts 80. Because of this arrangement, the portions of the fastening part 91 that are fixed with the mounting sections (part) 76a are hardly deformed.

The bolts 80 are installed from the second fastening hole 91e side and fastened with nuts 81 from the first fastening hole 76b (i.e. the opposite side) side such that the two sprockets 71 and 72 are fixed to opposite faces or sides of the mounting sections 76a. The bolts 80 are hollow bolts having enlarged heads with hexagonal sockets and threaded shafts extending therefrom, and the nuts 81 are hollow nuts each having a flange. The bolts 80 and nuts 81 are well-known items used for positioning and fastening front sprockets. In other words, the two sprockets 71 and 72 are fixed on opposite sides of the mounting sections (parts) 76a by the nuts 81 that are mounted from the (inner) side of the sprocket 72 and the bolts 80 that are mounted from the opposite (outer) side of the sprocket 71 (adjacent the flange sections 92b of the tubular members 92 of the sprocket 71).

Figure 7:
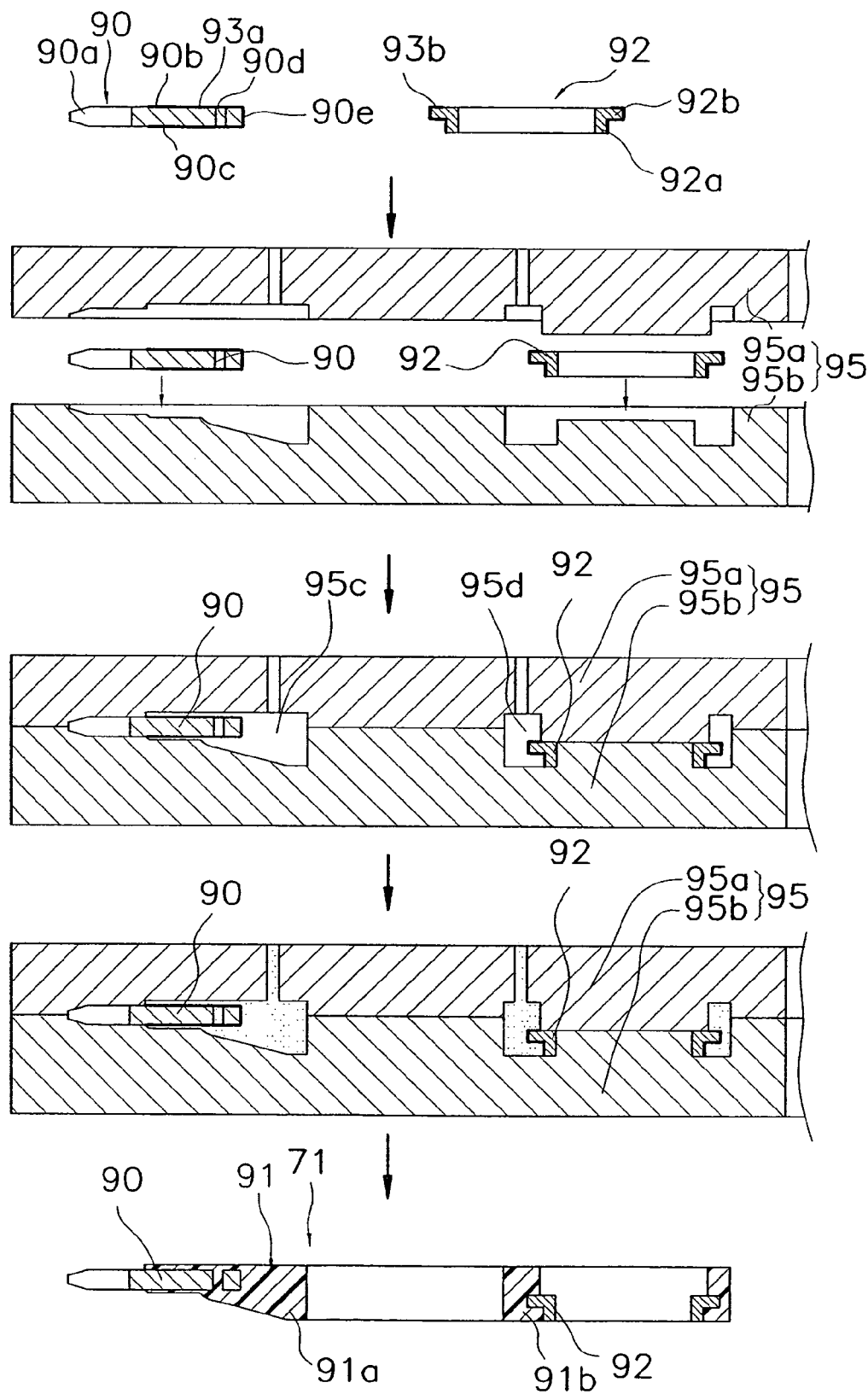
FIG. 7 is a diagrammatic view illustrating a manufacturing process for a sprocket in accordance with the present invention.

The sprocket 71 is manufactured using a process like that shown in FIG. 7 in accordance with the present invention. In order to simplify the drawings of FIG. 7, only a portion of the ring section 91a and one of the screw fastening sections 91b of the fastening part 91 is shown. The manufacturing process for the sprocket 71 of the present invention will now be discussed in more detail.

First, an aluminum (base) alloy plate is die punched to obtain a sprocket ring part 90 shaped as shown in FIGS. 4 and 6 in a conventional manner. Preferably, an anodic oxide layer (e.g. an anodized, oxidized porous aluminum, and/or alumilite layer) is then formed on the surface of the sprocket ring part 90. A continuous annular diffusion layer 93a of a fine triazine thiol powder is then formed on both lateral faces 90b and 90c and the inner circumference 90e of the sprocket ring part 90 using an electro deposition method. In addition, a diffused layer 93b of a fine triazine thiol powder is also formed on the outer circumference surface of the flange section (guard part) 92b and tubular part 92a of the tubular members 92. Each of these surface treatments are well known in the metal working/treating arts. Thus, each of these surface treatments will not be discussed and/or illustrated in detail herein, except as related to the present invention. The sprocket ring part 90 and the tubular members 92 on which the diffusion layers 93a and 93b have been formed are then inserted into a mold 95 having an upper die 95a and a lower die 95b for molding the fastening part 91. The inside of the mold 95 holds the radially outermost area of the sprocket ring part 90 (i.e. the sprocket teeth 90a and the area slightly radially inwardly thereof), while forming a space 95c for forming the fastening part 91 (the ring section 91a) therearound. Similarly, the inside of the mold 95 holds the inner circumferential area of each tubular member 92 to form a space 95d for forming the fastening part 91 (screw fastening sections 91b) therearound. After the sprocket ring part 90 and the tubular members 92 are positioned, the mold 95 is closed (fastened) and the internal spaces 95c and 95d are filled with a molten polyamide-based synthetic resin that has been impregnated with a reinforcing material such as carbon fiber filler. The synthetic resin and the diffusion layers 93a and 93b undergo a chemical reaction such that the fastening part 91 is chemically bonded together with the sprocket ring part 90 and the tubular members. Thus, by using an insert molding technique in this manner, a sprocket 71 having a fastening part 91 that is molded integrally with the sprocket ring part 90 and the tubular members 92 is completed.

Since the sprocket ring part 90 and the fastening part 91 are fixed together by molding the fastening part 91 integrally (i.e., chemically, adhesively fixing) to both lateral faces 90b and 90c of the sprocket ring part 90, looseness can be prevented and a high rigidity can be maintained between the sprocket ring part 90 and the fastening part 91. Additionally, the manufacturing process can be simplified because it is not necessary to provide a riveting step for installing rivets and/or crimp pins and a crimping step crimping them. Furthermore, the weight of the sprocket can be reduced because the fastening part 91 is made of a synthetic resin.

Similar advantages are obtained with the connection between the fastening part 91 and the tubular members 92. Moreover, since the metallic tubular members 92 that are more difficult to deteriorate due to age than synthetic resin are mounted in the fastening part 91, and the first contact surfaces 92c of the tubular members 92 receive power (axial fastening forces) from the bolts 80, even if relatively softer synthetic resin than typical metallic materials is used in the fastening part 91 to facilitate weight saving, enough fastening power/ force is maintained. Thus, the portion of the fastening part 91 that is fixed with the mounting sections (parts) 76a is hardly deformed, lowering of the fixing/fastening power due to deterioration of synthetic resin or deformation can be prevented, and weight saving of the sprocket 71 can be facilitated. In addition, backlash of the mounting sections (parts) 76a due to deterioration or deformation can be also prevented.

The sprocket 72 has a ring part 72b with a plurality of sprocket teeth 72a extending outwardly therefrom and a fastening part 72c that is integrally formed with the ring part 72b as a one-piece, unitary member. The fastening part 72c projects radially inward from the inner circumference of the ring part 72b. The sprocket 72 is constructed of a metallic material (for example, aluminum) using a well-known sprocket design and manufacturing techniques. The fastening part 72c of the sprocket 72 and the fastening part 91 of the sprocket 71 are fastened simultaneously to the support arm portions 76.

As shown in FIG. 3, the left crank arm 52 has a hollow-structured left main crank arm part or portion 85 provided with a pedal mounting hole 85a for screw-installing a pedal 53 on the tip end thereof. The left crank arm 52 is provided with a slit (not shown) in the inner end thereof that mounts to the crank shaft 50. The left crank arm 52 is fastened securely to the crank shaft 50 by tightening two mounting bolts 57a and 57b (which are arranged in positions shown below the crank shaft 50 in FIG. 3) such that the slit narrowed. The two mounting bolts 57a and 57b are, for example, hexagonal socket bolts inserted with their heads facing in opposite directions, respectively.

When mounting the crank set (crank unit) 41 configured as disclosed herein is mounted to the bottom bracket 54, the sprockets 71 and 72 are first mounted to the right crank arm 51. When the sprockets 71 and 72 are mounted to the right crank arm 51, the sprockets 71 are 72 are arranged in the recessed areas of the mounting sections 76a such that the respective fastening holes 76b and 91e are aligned face to face with each other. The bolts 80 are installed from the sprocket 71 side (i.e., the outside) and the nuts are installed from the sprocket 72 side (i.e., the inside) as best understood from FIGS. 3 and 5. The sprockets 71 and 72 are then secured by turning the bolts 80 using an Allen wrench (key) while preventing the nuts 81 from turning using a special tool.

After the sprockets 71 and 72 have been mounted, the right crank arm 51 is crimp-fastened to the crank shaft 50. In order to perform crimp-fastening, the right end of the crank shaft 50 is inserted into the engagement depression 78 of the right crank arm 51. Then, a crimping tool is mounted from the left end of the crank shaft 50. With the crimping tool attached thereto, the crank shaft 50 and are, for example, mounted to a holding tool whose shape is matched to the shape of the outside surface of the crank connecting part 75 and the right crank 77 of the right crank arm 51. Then, the crimping tool is pressed with a pressing device. The right crank arm 51 is thereby crimp-fastened to the crank shaft 50.

Figure 8:
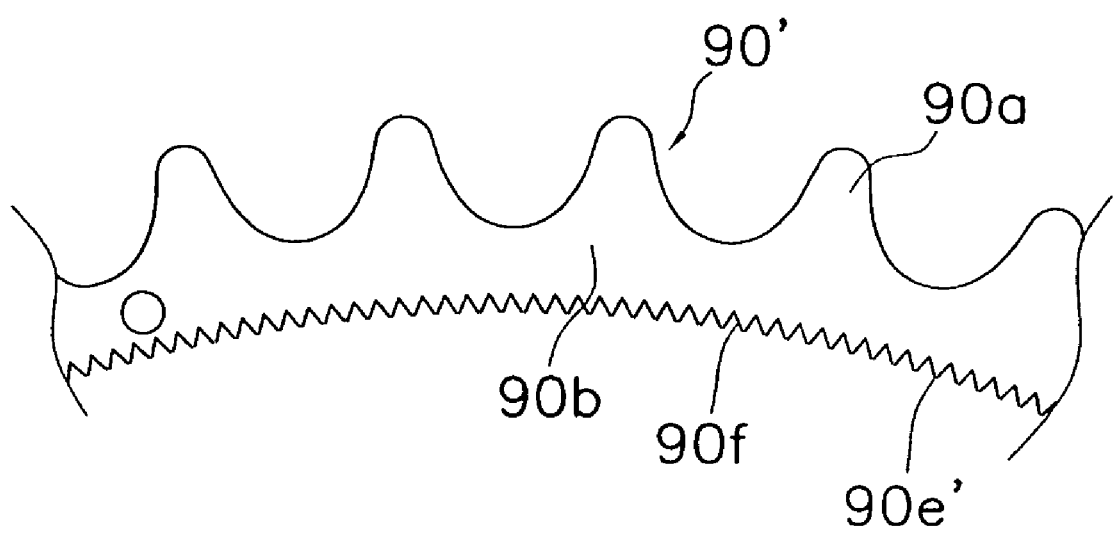
FIG. 8(a) is an enlarged, partial side elevational view of a sprocket ring part (equivalent to the view of FIG. 6) for a modified sprocket in accordance with another preferred embodiment of the present invention.
FIG. 8(b) is a side elevational view of a modified right crank arm with a modified sprocket utilizing the sprocket ring part illustrated in FIG. 8(a) in accordance with the present invention.
Figure 8:
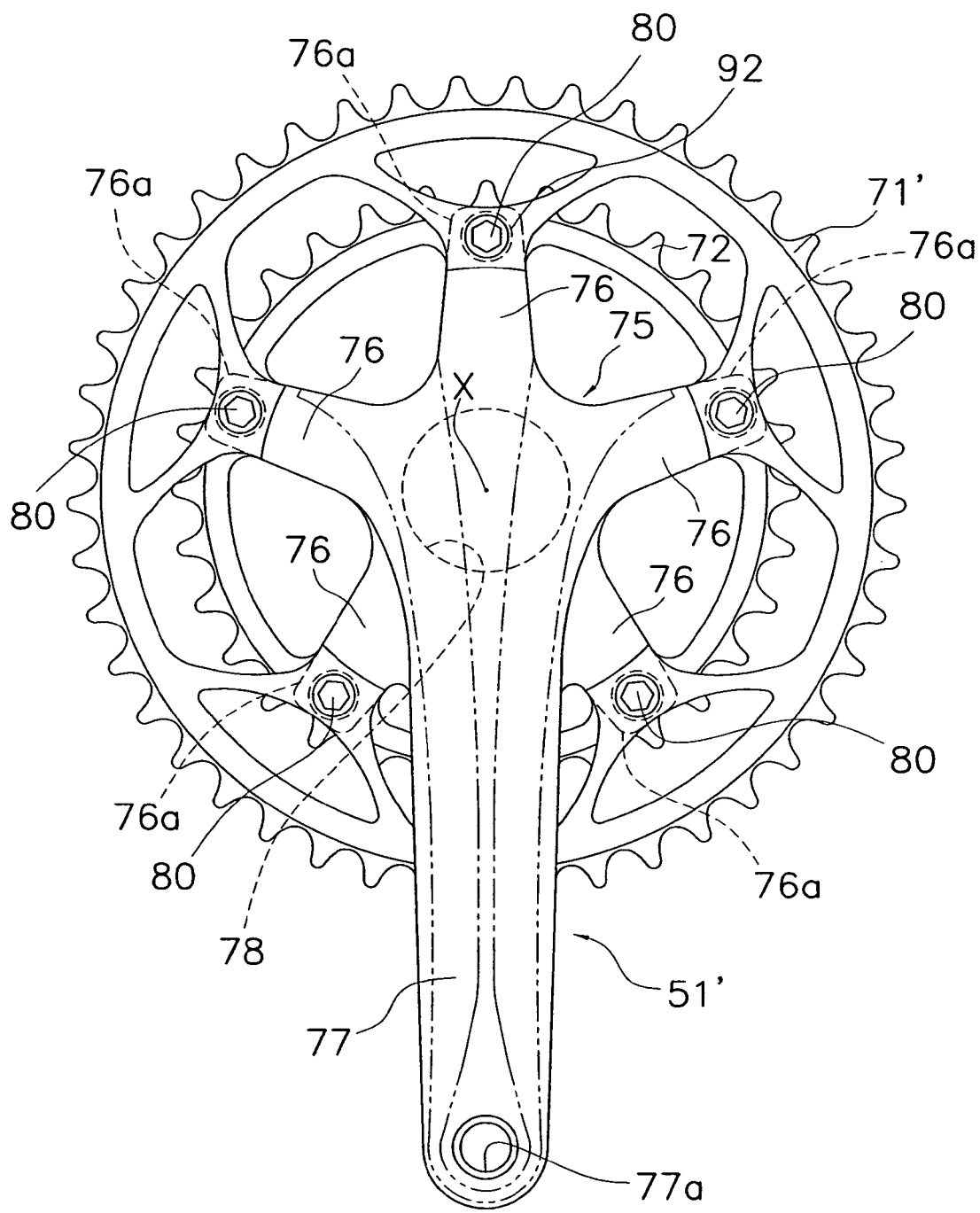

Other Embodiments (a) Referring to FIGS. 8(a) and 8(b), another embodiment of the present invention will now be discussed in more detail. In the previous embodiment the anchor structure (means) of the sprocket ring part 90 comprised multiple circumferentially-spaced through holes 90d provided in the lateral faces 90b (as shown in FIG. 6). However, it is also acceptable to replace the sprocket ring part 90 with a modified sprocket ring part 90' that has a modified anchor structure (means) at the inner circumference thereof that includes multiple protrusions and depressions 90f that are circumferentially arranged on the radially inward facing surface 90e' of the sprocket ring part 90' (as shown in FIG. 8(a)). In other words, the sprocket ring part of the present invention can have the configuration shown in FIG. 6 and/or the configuration shown in FIG. 8(a) about its entire inner circumference.

The modified sprocket ring part 90' is identical to the sprocket ring part 90, except the sprocket ring part 90' is preferably provided with the multiple protrusions and depressions 90f (FIG. 8(a)) instead of the holes 90d (FIG. 6), as mentioned above. Thus, the sprocket ring part 90' will not be discussed and/or illustrated in detail herein. Rather, it will be apparent to those skilled in the art from this disclosure that the descriptions and illustrations of the sprocket ring part 90 also apply to the modified sprocket ring part 90', except as explained and illustrated herein. Moreover, it will be apparent to those skilled in the art from this disclosure that the sprocket ring part 90' is configured to be used in place of the sprocket ring part 90 to form a modified sprocket 71' of a modified right crank arm 51', as seen in FIG. 8(b). In view of the similarities between the sprocket ring parts 90 and 90' identical reference numerals will be used to identify identical parts, while identical reference numerals with a prime (') will be used to identify modified parts of the sprocket ring part 90'. The right crank arm 51' and the sprocket 71' are identical to the right crank arm 51 and the sprocket 71 of the previous embodiment, except for the use of the modified sprocket ring part 90'. In any case, it will be apparent to those skilled in the art from this disclosure that the sprocket ring part of the present invention preferably includes an anchor structure (means) to facilitate a tight connection with the fastening part 91.

(b) Although the previous embodiments described examples of sprockets for a road bike, the present invention can be applied to any bicycle.

(c) Although the previous embodiments described examples of a sprockets configured to be mounted to a crank unit (crank set) 41 whose right crank arm 51 (51') is crimp-fastened to the crank shaft 50 that has the form of a hollow cylinder over its entire length, the present invention can also be applied to a sprocket configured to be mounted to a crank unit whose gear crank is bolt-fastened to the crank shaft or a crank unit having a separate right crank that is bolt-fastened to the crank shaft together with the gear crank. The present invention can also be applied to a sprocket configured to be mounted to the small (rear sprocket assembly) gear unit 43. Furthermore, it is acceptable for the sprocket 72, to also include a sprocket ring part made of an aluminum alloy and a fastening part made of a synthetic resin. In other words, while the features of the sprockets 71 (71') and the manufacturing techniques utilized to make the sprockets 71 (71') are particularly useful for the largest sprocket because it is typically heavier than smaller sprockets, it will be apparent to those skilled in the art from this disclosure that the present invention can be applied to any sized sprocket where the advantages of the present invention are desirable.

(d) Although in the previous embodiments the sprocket ring part 90 (90') is constructed of aluminum and the fastening part 91 is constructed of a polyamide-based synthetic resin, it will be apparent to those skilled in the art from this disclosure that it is acceptable for the sprocket ring part 90 (90') to be made of any other lightweight metallic material and for the fastening part 91 to be made of any other lightweight synthetic resin as needed and/or desired.

Figure 9:
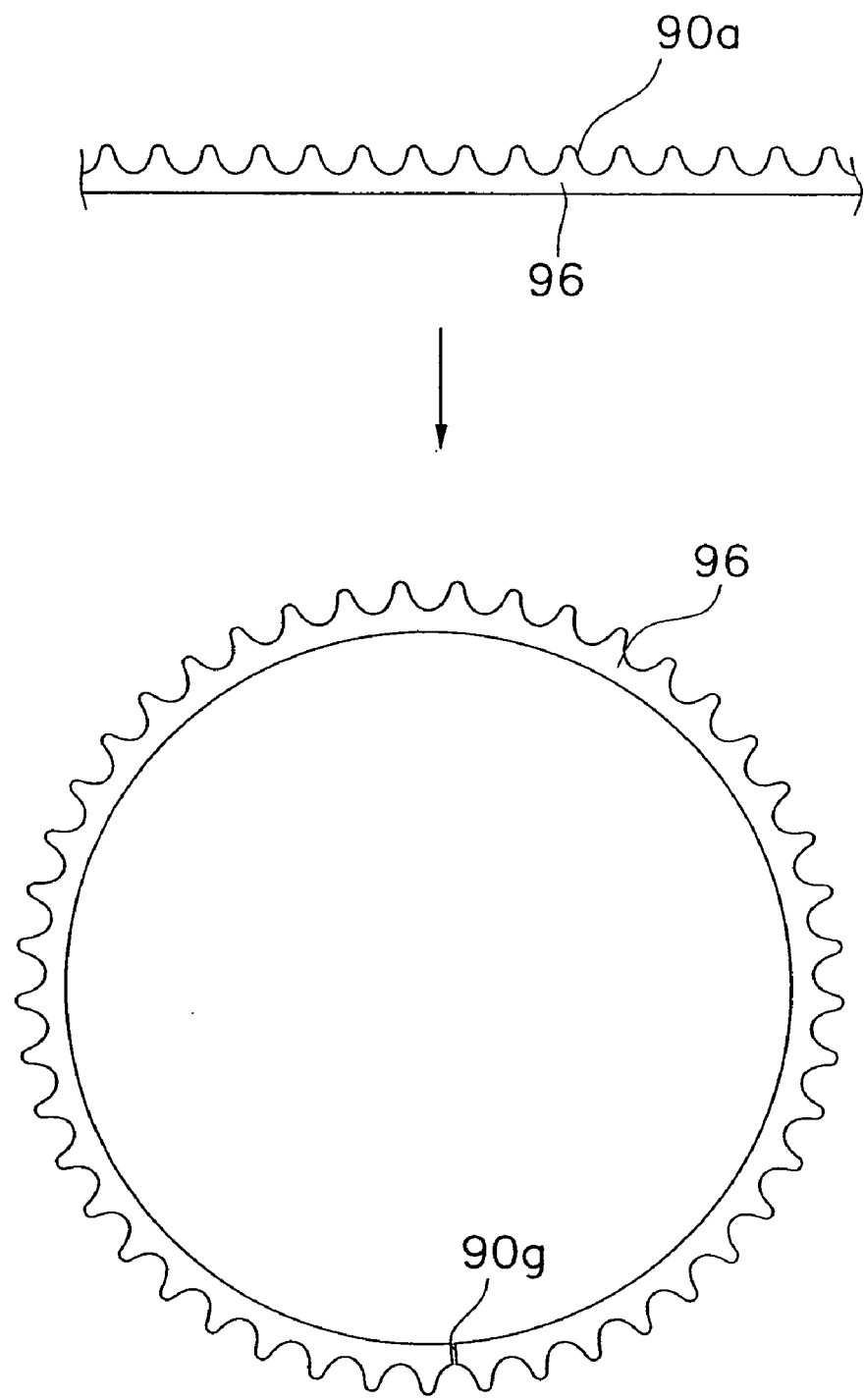
FIG. 9 is a diagrammatic view illustrating part of a modified manufacturing process in accordance with the present invention.

(e) Although in the previous embodiments the sprocket ring part 90 (90') is made by die punching an aluminum plate (metal plate) into the desired shape with the desired anchor structure (means), it will be apparent to those skilled in the art from this disclosure that it is also acceptable to fabricate the sprocket ring part 90 (90') as shown in FIG. 9 by die punching a metal plate 96 into a flat rope-like piece having the sprocket teeth 90a arranged lengthwise on one side thereof and the anchor structure (means) along the opposite side, and then bending the rope-like piece into a ring shape in such a manner that the sprocket teeth 90a face radially outward and the anchor structure (means) is arranged radially inwardly. In such a case, a gap 90g is formed in the sprocket ring part 90 (90'). It is acceptable to either join the gap 90g by welding or crimping or to leave the gap unjoined. Even if the gap 90g is left unjoined, it is unlikely that the gap will cause a problem because the sprocket ring part 90 (90') is fixed to the fastening part 91 by the integral molding of the fastening part 91 described above.

(f) In the previous embodiments, each tubular member 92 is configured as a tube with an annular flange section (guard part) 92b. However, it will be apparent to those skilled in the art from this disclosure that the tubular members may be constructed (configured) without annular flange sections (guard parts).

(g) In the previous embodiments, the sprocket ring part 90 and the fastening part 91 are formed together by molding the fastening part partially around the sprocket ring part 90. However, it will be apparent to those skilled in the art from this disclosure that the sprocket ring part 90 may be fixed to the fastening part 91 by alternative fixing methods, such as with crimp pins or threaded fasteners (e.g. a screw clamp arrangement or a bolt and nut clamping arrangement). In addition, it will be apparent to those skilled in the art from this disclosure that the tubular members 92 as well, may be fixed to the fastening part 91 by alternative fixing methods, such as with a retaining ring or threaded fasteners (e.g. a screw clamp arrangement or a bolt and nut clamping arrangement).

As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle sprocket comprising:
   a sprocket ring part including an inner periphery and an outer periphery with a plurality of sprocket teeth arranged on the outer periphery, the sprocket ring part extending around a central rotation axis with the sprocket ring part being made of metallic material;
   a plurality of metallic tubular members circumferentially spaced apart from one another about the central rotation axis and positioned radially inward from the inner periphery of the sprocket ring part; and
   a synthetic resin fastening part non-movably coupled to the sprocket ring part at a location radially inwardly of the sprocket teeth relative to the rotation axis and formed around a portion of each of the plurality of metallic tubular members such that each of the plurality of metallic tubular members is rigidly and non-removably fixed to the synthetic resin fastening part, the synthetic resin fastening part including a plurality of through holes, each of the plurality of through holes being co-axially aligned with a corresponding one of the plurality of metallic tubular members, the through holes configured to be fixedly coupled to a rotational drive unit of a bicycle, the metallic tubular members each having a first fastener contact surface configured and arranged to receive a fastening force,
   the sprocket ring part including a first anchor structure and the synthetic resin fastening part including a second anchor structure that is directly engaged to the first anchor structure to prevent relative movement of the first anchor structure of the sprocket ring part in a radial outward direction with respect to the second anchor structure of the synthetic resin fastening part, the sprocket ring part and the synthetic resin fastening part being two separate members.

2. The bicycle sprocket as recited in claim 1, wherein the metallic tubular members are further positioned radially outward relative to the central rotation axis, each of the metallic tubular members having a smaller outer diameter portion and a larger outer diameter portion, with the larger outer diameter portion having a larger outer diameter than the smaller outer diameter portion, the larger outer diameter portion having a cylindrical external surface that extends in a direction parallel to a central axis of each of the metallic tubular members and faces radially outward relative to the central axis of each of the metallic tubular members.

3. The bicycle sprocket as recited in claim 2, wherein the metallic tubular members are non-movable relative to the synthetic resin fastening part in an axial direction substantially parallel to the central rotation axis.

4. The bicycle sprocket as recited in claim 3, wherein the synthetic resin fastening part is at least partially integrally molded around the metallic tubular members to prevent movement of the metallic tubular members relative to the synthetic resin fastening part in the axial direction.

5. The bicycle sprocket as recited in claim 4, wherein each of the metallic tubular members includes a flange section extending outwardly therefrom relative to a central through axis of the metallic tubular member, the first fastener contact surface being formed on the flange section.

6. The bicycle sprocket as recited in claim 5, wherein each of the metallic tubular members includes a second contact surface that is configured and arranged to contact the rotational drive unit.

7. The bicycle sprocket as recited in claim 6, further comprising
a fastening member with an enlarged head that is sized and configured to contact the first fastener contact surface to apply the fastening force.

8. The bicycle sprocket as recited in claim 7, wherein the fastening member is a bolt with a threaded shaft and the enlarged head arranged at one end of the threaded shaft.

9. The bicycle sprocket as recited in claim 4, wherein the sprocket ring part includes a pair of sides and the synthetic resin fastening part is at least partially integrally molded around both sides of the sprocket ring part.

10. The bicycle sprocket as recited in claim 9, wherein the synthetic resin fastening part is constructed of a polyamide based synthetic resin with a carbon fiber filler impregnated therein.

11. The bicycle sprocket as recited in claim 2, wherein the synthetic resin fastening part is at least partially integrally molded around each of the metallic tubular members to prevent movement of the metallic tubular members relative to the synthetic resin fastening part in an axial direction substantially parallel to the central rotation axis.

12. The bicycle sprocket as recited in claim 2, wherein each of the metallic tubular members includes a flange section extending outwardly therefrom relative to a central through axis of the metallic tubular member, the first fastener contact surface being formed on the flange section.

13. The bicycle sprocket as recited in claim 2, wherein each of the metallic tubular members includes a second contact surface that is configured and arranged to contact the rotational drive unit.

14. The bicycle sprocket as recited in claim 2, wherein the sprocket ring part includes a pair of sides and the synthetic resin fastening part is at least partially integrally molded around both sides of the sprocket ring part.

15. The bicycle sprocket as recited in claim 2, further comprising
a fastening member with an enlarged head that is sized and configured to contact the first fastener contact surface to apply the fastening force.

16. The bicycle sprocket as recited in claim 15, wherein the fastening member is a bolt with a threaded shaft and the enlarged head arranged at one end of the threaded shaft.

17. The bicycle sprocket as recited in claim 2, wherein the synthetic resin fastening part is constructed of a polyamide based synthetic resin with a carbon fiber filler impregnated therein.

18. The bicycle sprocket as recited in claim 2, wherein the sprocket ring part is constructed of an aluminum alloy that has an anodic oxide layer formed on the surface thereof.

19. The bicycle sprocket as recited in claim 2, wherein each of the metallic tubular members is constructed of an aluminum alloy.

* * * * *